No. 797,167. PATENTED AUG. 15, 1905.
D. H. BEYEA.
SALT HOLDER.
APPLICATION FILED OCT. 6, 1904.
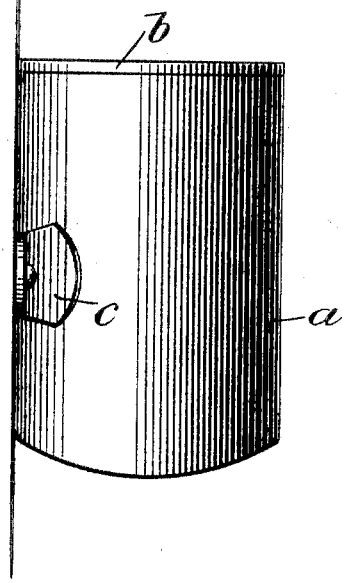
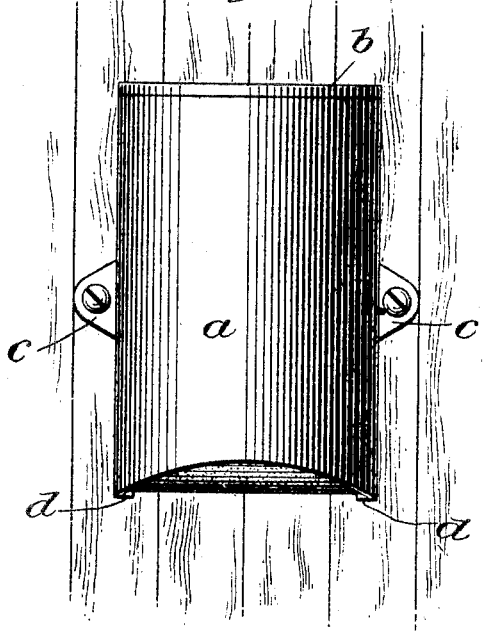
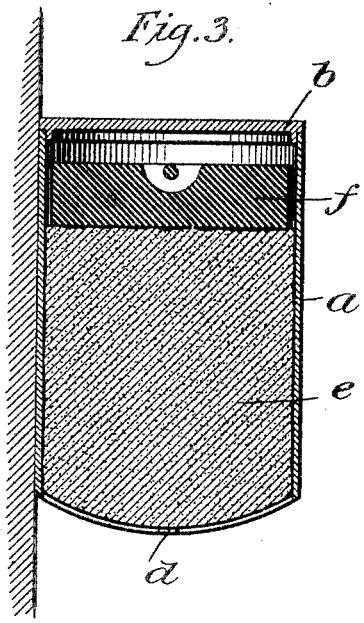
WITNESSES:
Edward Thorpe.
Isaac B. Owens.
INVENTOR
David H. Beyea
BY
ATTORNEYS

UNITED STATES PATENT OFFICE.

DAVID H. BEYEA, OF NEW YORK, N. Y.

SALT-HOLDER.

No. 797,167.　　　　Specification of Letters Patent.　　　　Patented Aug. 15, 1905.

Application filed October 6, 1904. Serial No. 227,383.

*To all whom it may concern:*

Be it known that I, DAVID H. BEYEA, a citizen of the United States, and a resident of the city of New York, borough of Brooklyn, county of Kings, and State of New York, have invented a new and Improved Salt-Holder, of which the following is a full, clear, and exact description.

The invention relates to a device intended particularly to hold solid salt, so that it may be licked by live stock.

The object of the invention is to insure keeping the salt in good condition and to prevent the waste thereof. This end I attain by a peculiarly-constructed can-like receptacle open at its lower end and adapted to contain salt, so that part of the surface thereof is exposed through the open lower end of the receptacle. This allows the salt to be licked by the animal at all times; but it prevents undue absorption of moisture by the salt and also extravagant and wasteful use thereof by the animal.

This specification is an exact description of one example of the invention, while the claims define the actual scope thereof.

Reference is had to the accompanying drawings, which form a part of this specification, in which drawings like letters of reference indicate like parts in the several views, and in which—

Figure 1 is a side view of the invention. Fig. 2 is a front view thereof, and Fig. 3 is a vertical central section thereof.

Referring to the drawings, $a$ indicates the receptacle, which preferably is cylindrical in form and is shown as provided with a suitable cover $b$ for the upper end thereof; but this may be omitted. The receptacle $a$ has ears $c$ attached to its sides to permit securing the receptacle in position, as shown. The lower end of the receptacle is open, so as to expose the lower portion of the salt and permit it to be conveniently reached by the animal. Some suitable support is provided at the lower end of the receptacle to uphold the cake of salt by engaging its margin. In the construction shown this support is in the form of inwardly-projecting lugs $d$, (one or more,) on which the outer or marginal portion of the salt cake $e$ rests. Preferably the support is at the lowest point, and the receptacle is rounded up therefrom, as shown. This rounding is more important at the front, (see Fig. 2,) as it better exposes the salt to the licking action.

By making the salt cake a cylinder and the receptacle without any obstruction to the turning of the salt the latter will be caused to turn little by little by the upward pressure and dragging action of the tongue of the animal in licking the salt. This turning action insures that the cake shall be gradually and uniformly consumed and avoids waste. By placing the support at the lowest level the cake gradually descends as it is turned.

A follower-weight $f$ may be placed over the salt to keep the same pressed down firmly on the lugs $d$; but this is not practically necessary.

The salt may be of any nature suited to the purpose. I preferably employ a mass or block of salt produced by subjecting ordinary granular salt to an extreme pressure, forming it into a solid cake. This cake is placed in the receptacle $a$, the weight $f$ being placed on the salt, if desired. The weight of the cake keeps it pressed down against the lugs and feeds it continually as it is used.

This arrangement, therefore, not only keeps the salt continually fed into position for use, but it also prevents excessive absorption of moisture by the salt, and even such moisture as it absorbs is confined to a relatively small portion of the area of the block or mass of salt. This keeps the salt in good condition at all times and effects a material economy in the use thereof.

Various changes in the form, proportions, and minor details of my invention may be resorted to at will without departing from the spirit and scope thereof. Hence I consider myself entitled to all such variations as may lie within the terms of my claims.

Having thus described my invention, I claim as new and desire to secure by Letters Patent—

1. A salt-holder comprising an upright receptacle adapted to receive a cylindrical cake of salt and to permit it to turn as the animal licks it, having an opening exposing the lower portion of the cake, and a bottom support on which a marginal part of the cake may rest.

2. A salt-holder comprising an upright receptacle adapted to receive a cylindrical cake of salt and to permit it to turn as the animal licks it, having a bottom support on which a marginal part of the cake may rest, and a bottom opening exposing the lower portion of the cake, said opening extending on one side to a higher level than the support so that as the cake turns it descends.

3. A salt-holder comprising an upright receptacle adapted to receive a cylindrical cake of salt and to permit it to turn as the animal licks it, having a bottom support on which a marginal part of the cake may rest, and a bottom opening exposing the lower portion of the cake, said opening extending forward of said support and extending on its front side to a higher level than the support so that as the cake turns it descends.

4. A salt-holder comprising an upright cylindrical receptacle, open at bottom, and having at its bottom an inward projection supporting the cake at the margin only thereof.

In testimony whereof I have signed my name to this specification in the presence of two subscribing witnesses.

DAVID H. BEYEA.

Witnesses:
   ISAAC B. OWENS,
   JNO. M. RITTER.